March 31, 1925.
F. G. MATTSON
SAW
Filed Nov. 7, 1924
1,531,675
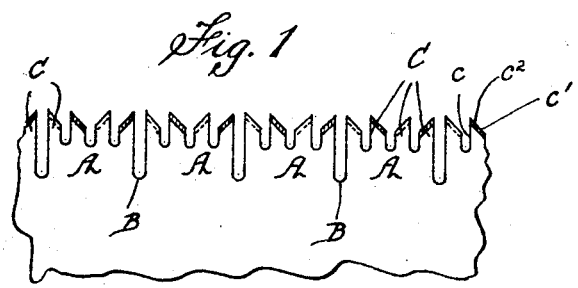
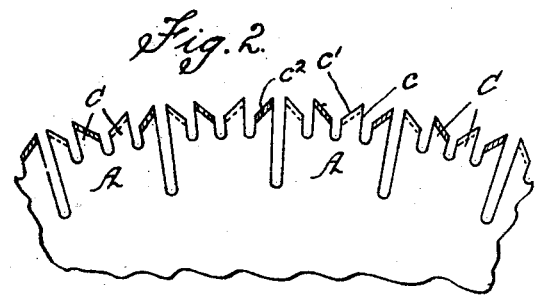
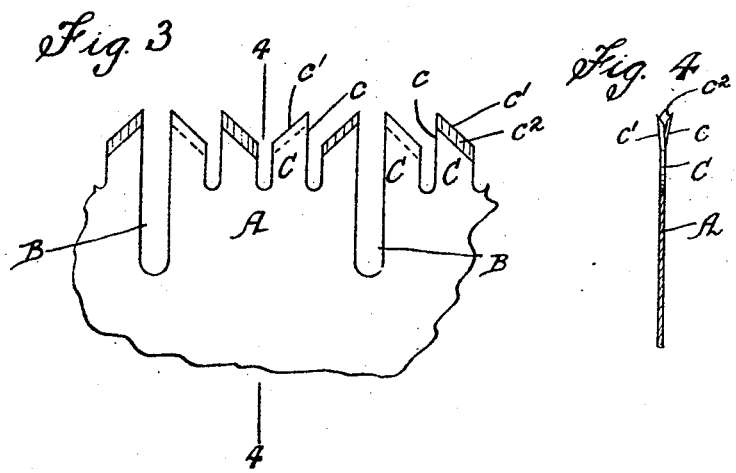
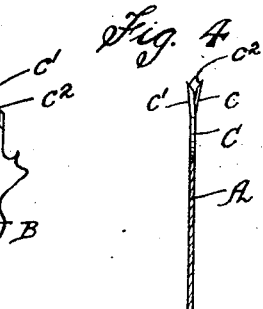
Inventor:
Frank Godfrey Mattson
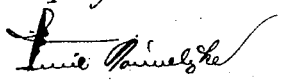
Attorney Patented Mar. 31, 1925.

1,531,675

UNITED STATES PATENT OFFICE.

FRANK GODFREY MATTSON, OF KOTUKU, WESTLAND, NEW ZEALAND.

SAW.

Application filed November 7, 1924. Serial No. 748,455.

*To all whom it may concern:*

Be it known that I, FRANK GODFREY MATTSON, subject of the King of Great Britain, residing at Kotuku, Westland, in the Dominion of New Zealand, have invented new and useful Improvements in Saws, of which the following is a specification.

This invention relates to an improved formation of saw blade adaptable for all classes of saws whether hand saws, gang saws, circular saws, band saws, cross-cut saws, or the like. It has been devised with the object of providing a formation or construction of cutting edge that will allow of the saw being used with equal effectiveness for either cross-cut or rip work and to cut as the blade is moved in both directions.

The invention therefore consists in constructing the blade with teeth of special formation by means of which these results are obtained.

This formation is shown in the accompanying drawings, in which:—

Figure 1 is a side elevation of a portion of an ordinary saw blade having its teeth constructed in accordance herewith.

Figure 2 is a similar view of a portion of a circular saw.

Figure 3 is a detail side elevation of some of the teeth, drawn on an exaggerated scale.

Figure 4 is a cross sectional elevation on the line 4—4 of Figure 3.

The invention is carried out by forming the blade edge with a number of equally spaced major teeth A, divided from one another by means of clearance slots B of approved width and depth, and in forming each major tooth A with four specially shaped and disposed smaller teeth C. These smaller teeth C are spaced evenly apart and are made of equal width and each is shaped of narrow right-angled triangular form at its point so that one edge $c$ is made to extend out at right angles to the line of the blade while the other $c'$ inclines inwards from the apex or point. The side face of each inclined edge is also bevelled as at $c^2$ so that, with the point, a fine cutting edge is formed.

The four small teeth C of each major tooth are arranged relatively so that they form pairs, two teeth together having their straight edges $c$ facing in one direction and the other two having theirs facing in the other direction. This arrangement differs in order with the small teeth of the next major tooth, so that throughout the saw length, the small teeth are arranged in pairs with those of each pair having their cutting edges $c'$ facing in the opposite direction to those of the pairs next in order to it. The two teeth of each pair also have their cutting bevels $c^2$ disposed on respectively opposite faces of the blade, and in addition, are "set" outwards on the opposite faces, as shown in Figure 4.

This construction allows for the saw being readily sharpened as and when required.

A saw blade having its teeth thus formed, is designed in its operations in an ordinary reciprocating saw, to cut as it moves in each direction. When cross-cutting, the inclined edges $c'$ operate while in ripping, the straight edges $c$ with the points, act. In circular saws where the motion is continuously in the one direction, as also in band saws, the teeth are disposed so that they act in both manners to cross-cut or to rip. The application of the invention to circular saws will permit of the saw being driven to rotate in either direction and to cut as efficiently in both, and also for the saw having its faces reversed upon its spindle.

The spaces or gullets B provide for the collection and clearance of the saw dust in the saw's operations so that no jambing or choking can take place.

I claim:—

A saw blade constructed with its cutting edge formed with a number of major teeth of equal width divided by clearance slots and each of which major teeth is formed with four smaller teeth evenly spaced apart and of equal width, and each shaped with a point of right angled triangular form, each four small teeth being so arranged with respect to themselves and those of the adjacent major teeth, that throughout the length of the cutting edge, the small teeth are arranged in pairs with those of one pair having the angular edges of their points facing in the opposite direction to those of the pairs on each side of it, and in which each small tooth has its angular edge bevelled on the opposite face of the blade to that on which the teeth next in order to it are bevelled, substantially as specified.

In testimony whereof, I affix my signature.

FRANK GODFREY MATTSON.